United States Patent [19]
Krafft et al.

[11] 3,761,789
[45] Sept. 25, 1973

[54] TOOL CARRIER AND SPEED CONTROL THEREFOR

[75] Inventors: Lewis E. Krafft, Elgin; John Battin, Mount Prospect, both of Ill.

[73] Assignee: said Krafft, by said Battin

[22] Filed: Apr. 17, 1972

[21] Appl. No.: 244,513

Related U.S. Application Data
[63] Continuation of Ser. No. 89,928, Nov. 16, 1970, abandoned.

[52] U.S. Cl................. 318/331, 318/341, 318/345, 323/34, 323/37
[51] Int. Cl. ............................................ H02p 5/16
[58] Field of Search.................... 318/328, 331, 2, 318/341, 345, 227; 323/34, 37

[56] References Cited
UNITED STATES PATENTS
3,470,436   9/1969   Steele .......................... 318/345 X
3,344,332   9/1967   Polries ........................... 318/345 X

*Primary Examiner*—J. D. Miller
*Assistant Examiner*—Robert J. Hickey
*Attorney*—Richard J. Myers

[57] ABSTRACT

A tool carrier having a rotary portion and a control circuit operative to control the same at a selected speed, the control circuit having an output voltage which is a function of the speed of the rotary portion, the rotary portion including means for generating a signal voltage which is fed to the control circuit, where the rectified value thereof operates to vary the output voltage thereof in such a manner that a preselected speed of the rotary portion is maintained over varying load conditions.

13 Claims, 4 Drawing Figures

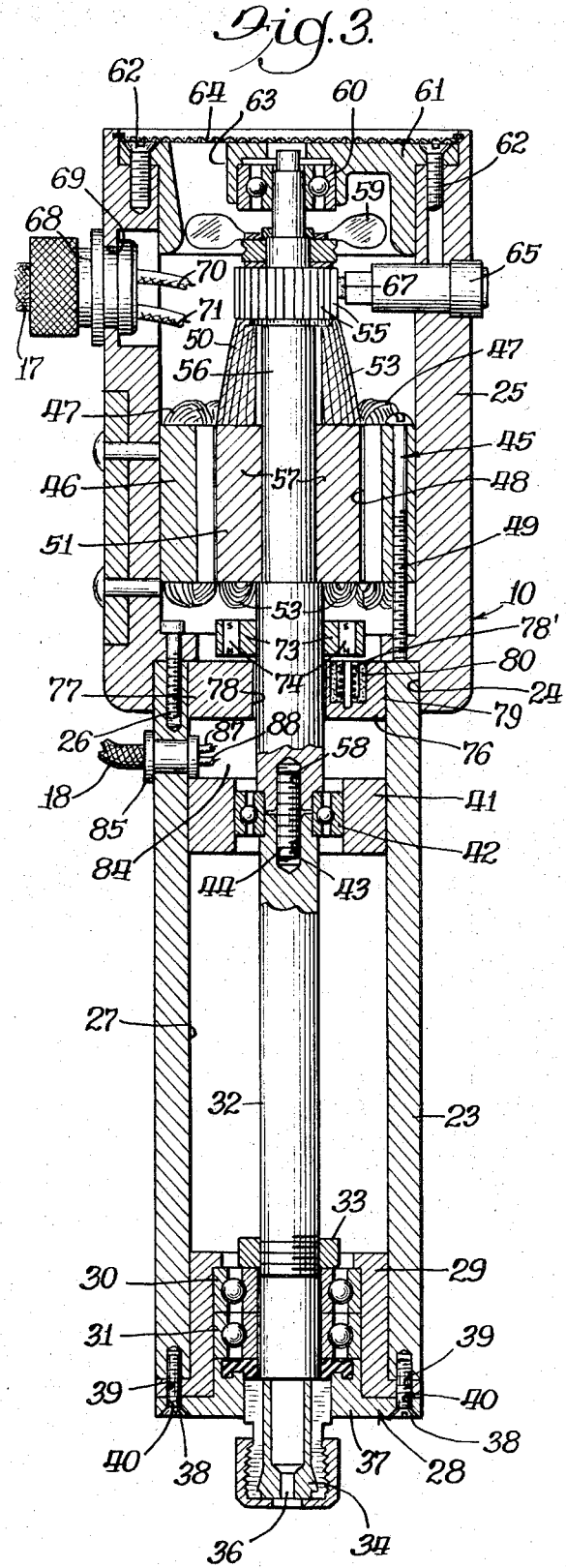
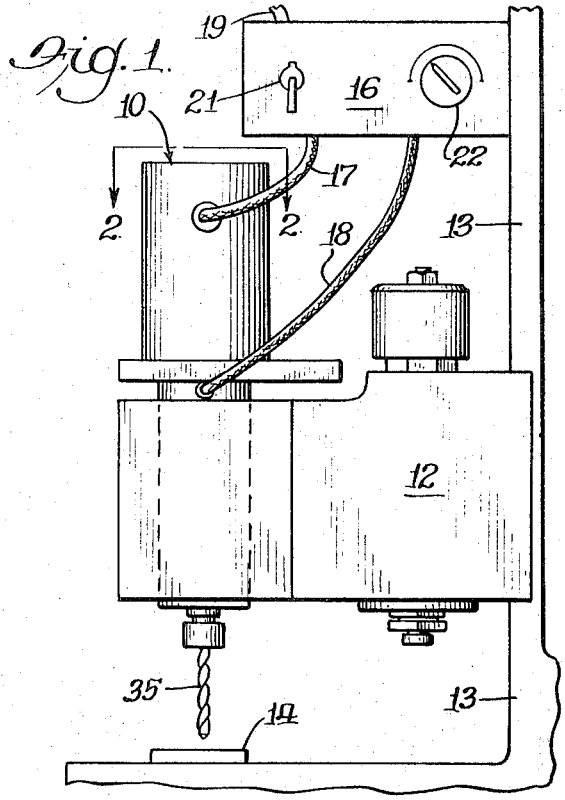
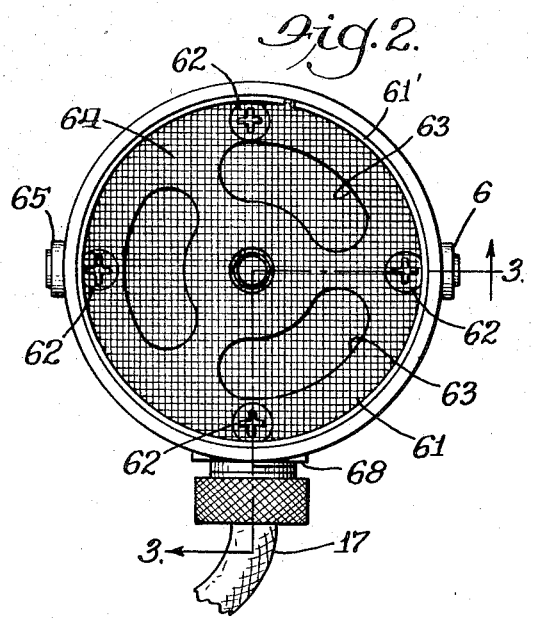

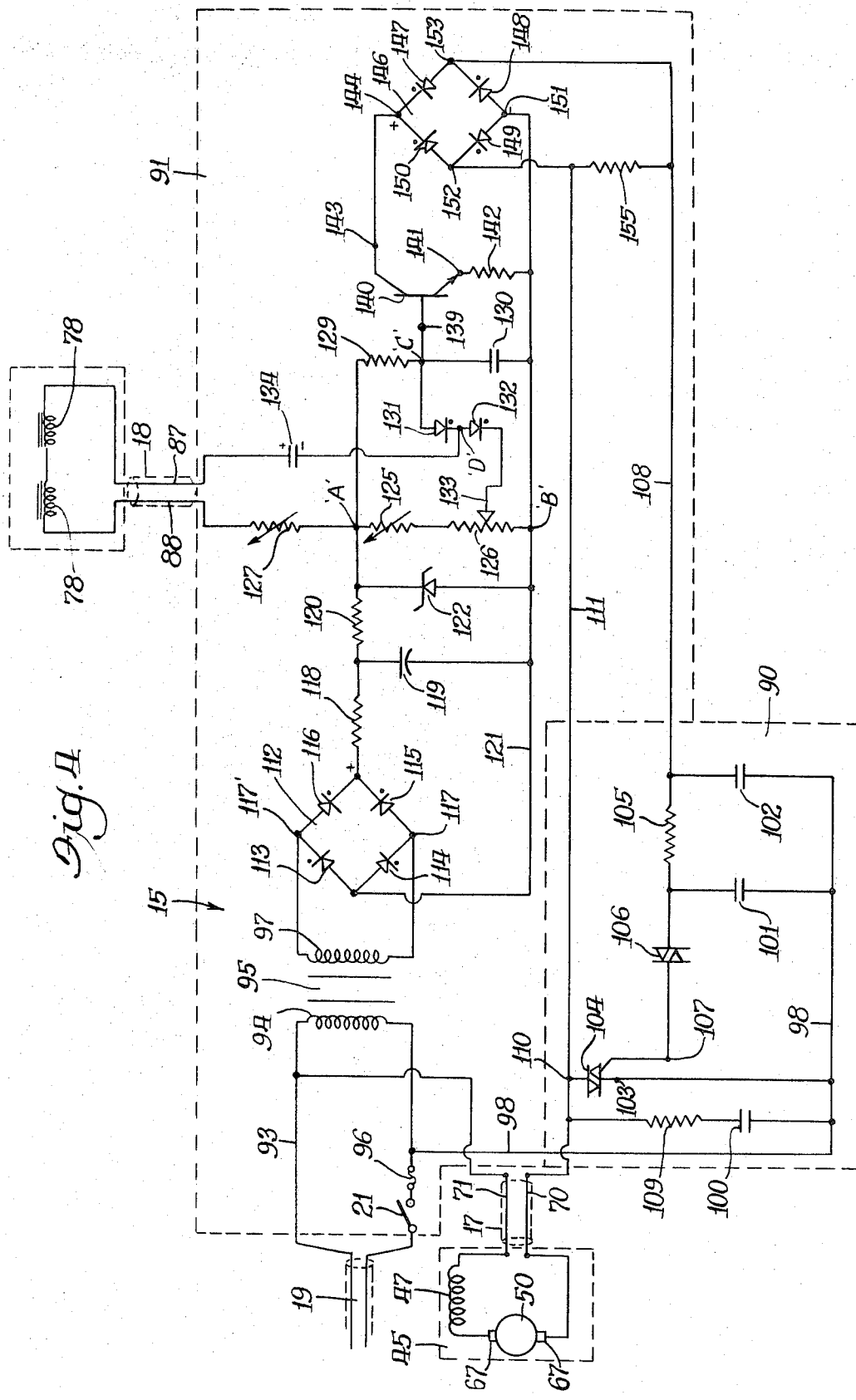

3,761,789

TOOL CARRIER AND SPEED CONTROL THEREFOR

This is a Continuation of application Ser. No. 89,928 filed Nov. 16, 1970 now abandoned.

BACKGROUND OF THE INVENTION

This invention relates to control circuit adapted to machine tools such as drills, broaching or engraving tools. In the use of machine tools which advance and retract tool bits with respect to the work piece it is particularly important that cutting speeds be maintained within optimum ranges in order to effect proper cutting action to thereby assure quality workmanship.

Maintaining proper tool cutting speed is also important to protect the tool bit from excessive heating as tool bit speeds change due to the machine being loaded because of variations in feed rates or the amount of material contacted by the tool bit.

Heretofore machine operators became aware of machine loading reflected in changes in tool speeds which were less than optimum by sensing variations in cutting sounds and/or by observing a lessening in the cutting qualities of the tool on the material. It is apparant that the quality of the work product such an arrangement is highly dependent on the skill of the operators. Furthermore an arrangement which allows tool cutting speed to vary with machine loading would not lend itself to automated machining operations.

A general object of the invention is to provide a novel electrical control device.

A further object of the invention is to adapt that control device for maintaining a predetermined speed of a machine tool having rotary portion driving a tool carrier.

Another object of the invention is to provide that rotary portion have means coupled in operative cooperation with the control device to effectively monitor the speed of the tool carrier.

A more specific object of the invention is that the rotary portion of the machine have a speed which is proportional to a controlling input voltage wherein the control device has an output voltage coupled to that input voltage effective to control the speed of the rotary portion.

The invention contemplates using a phase-control electronic circuit having a controlling input portion coupled to an associated diode-transistor network effective to control the average output voltage of the control circuit.

The invention comprehends that the diode-transistor network of the control circuit have input terminals receivable of electrical signals such that the input impedance level to the controlling input portion of the phase-control circuit is a function of the voltage of the electrical signals.

A more specific object of the foregoing is to provide that the rotary portion have means for generating a signal voltage proportional to the speed thereof, wherein that signal voltage acts upon the diode-transistor network to effect a corresponding variation in the average output voltage of the control circuit.

A still further specific object of the foregoing is to provide that the rotary portion of the machine tool be driven by a Universal-type electric motor having speed characteristics substantially proportional to the average voltage at it's input terminals.

Still another specific object of the foregoing is to provide the rotor and portions adjacent thereto of the above mentioned motor incorporate the aforementioned voltage generating signal means.

The foregoing and other advantages and features of the invention will be apparent from the following more particular description of a preferred embodiment of the invention as illustrated in the accompanying drawings.

BRIEF DESCRIPTION OF THE DRAWINGS

FIG. 1 is an elevation view of the machine tool carried in a stand and showing the control cabinet adjacent thereto;

FIG. 2 is an end view of the machine tool taken substantially at line 2—2 of FIG. 1;

FIG. 3 is an elevational view in section taken substantially at line 3—3 of FIG. 2; and FIG. 4 is a schematic electrical diagram of the control circuit.

DESCRIPTION OF THE PREFERRED EMBODIMENT

Turning attention to FIG. 1, a machine tool generally designated 10 carried by a holder 12 mounted on a support frame 13 which also serves to carry a work piece 14. A control cabinet designated 16 is mounted on the frame 13 and houses an electronic control circuit 15 which has output cable 17 and an input signal carrying cable 18, each connected to the machine tool 10 as shown. The control box also has a line cord 19 connected to a suitable power source supplying alternating current at 120 volts and 60 Hertz. As seen, an off-on switch 21 and speed selector control knob 22 are mounted on the face of the control cabinet, the operating function of which will be described hereinafter.

Describing the invention in detail and having particular reference to the FIGS. 2 and 3, the machine tool 10 comprising a cylindrical spindle housing 23 which is received into a bore 24 of a motor housing 25 and secured thereto by a plurality of screws one of which is shown at 26. The spindle housing has an internal bore 27 receiving at the outer end portion thereof a front assembly, generally designated 28, comprising a bearing holder 29 into which front bearings 30 and 31 are mounted. A spindle shaft 32 is rotatably mounted in the bearings and is secured from lateral outward movement by a spindle locknut 33 threaded on the spindle shaft adjacent the inner facing side of the inward bearing 30. Secured to the outer distal end of the spindle shaft 32 is a chuck 34 operative for removably carrying a tool bit, such as a drill 35 in an opening 36 therein. The chuck 34 may be surrounded by an end plate 37 which extends inwardly of the spindle housing 23 to engage and thereby secure the front bearing 30 and 31 in position. Screws 38 pass through aligned holes 39 and 40 in the bearing holder 29 and end plate 37 respectively and thread into the spindle housing 23 as shown in FIG. 3, to thereby secure the front assembly 28 in proper position at the outer end portion of the spindle housing.

Near the inner end of the spindle housing 23 is positioned an internal bearing holder 41 which has been press fitted into the internal bore 27 of the spindle housing. A middle bearing 42 is held in position by the internal holder 41. The spindle shaft 32 terminates at it's inner end and is rotatably supported thereat at a location approximately intermediate the middle bearing 42 as shown. The spindle shaft 32 has a threaded internal bore 43 into which is fastened a stud 44.

The motor housing 25 houses a commercially available electrical motor designated 45, the type commonly referred to as a universal motor. The motor 45 comprises a stator having a pair of diametrically arranged laminated iron pole pieces 46 wound about with electrical conductors in a series arrangement defining a stator winding designated 47. The pole pieces having an inward curved surface defining a cylindrically shaped concavity 48 therebetween when secured to the housing 25 by a plurality machine screws, one of which is typically illustrated 49. The concavity 48 receives therein a rotor assembly 50 comprising a laminated iron core 51 which has slots therein for receiving and securing a system of rotor windings 53 wound thereabout and electrically connected to a plurality of serially arranged commutator segments 55 cylindrically disposed at one end of the rotor assembly. The quantity of the stator and rotor windings 47 and 53 and their relative positions on their respective pole pieces and iron core, the wiring configuration of the entire motor and the disposition of the rotor within the pole pieces is commonly known to those ordinarily skilled in the art and will not be described in detail here. It is to be understood that the electric motor shown here is merely a vehicle for description and that other prime movers such as an air or hydraulically driven motor could be used within the invention concepts herein disclosed.

It can be seen that the rotor assembly 50 includes a rotor shaft 56 on which is mounted the iron core 57 and the commutator segments 55. The commutator segments are electrically insulated from the rotor shaft just as the rotor and stator conductors are electrically insulated from the parts about which they are wound and other parts of the motor and housing.

One end of the rotor shaft extends into the internal bore 27 of the cylindrical housing 23 and is rotatably supported by the middle bearing 42. It can be seen that this end of the rotor shaft has a threaded internal bore 58 similar to the thread bore 43 of the spindle shaft 32 and axially aligned therewith. The stud 44 is threaded into each of the internal bores (58, 43) and affixes them together in a space apart, adjacent relationship as shown, thereby producing a principal axial drive relationship from the rotor assembly 50 of the motor to the chuck 34 and tool bit 35. The other end portion of the rotor shaft 56 carries a ventilating fan blade 59 pressed thereon to thereby be constrained to rotate therewith. The end of this portion of the shaft is mounted and supported in a bearing 60 held in axial alignment with the other bearings (42, 30, 31) by a motor end plate 61 secured to the motor housing 25 by four machine screws 62 as shown. As best seen in FIG. 2 the end plate has apertures 63 therethrough and a screen 64 in a covering relation thereover to provide in combination, ventilation and protection from debris and damaging large particles from entering the motor. A retaining ring 61' is operative to secure the screen 64 in proper position. Brush holders 65 and 66 being rectangularly hollow are mounted through the motor housing 25 as illustrated in FIG. 3 showing the brush holder 65 in position. Each brush holder has therein an electrically conductive brush 67 biased at diametrically disposed locations on the commutator segments 55 by an internal spring (not shown).

A grommet 68 is secured in a hole 69 in the motor housing 25 and receives therethrough the power output cable 17 from the control cabinet. The power output cable has two conductors 70 and 71 connected serially wherein conduction from one conductor, such as 71, is through the stator winding 47 then to the brush 67 (of brush holder 65) which conducts to some of the stator segments 55, then through the rotor windings 53 and out through other stator segments 55 into the brush 67 (of the other brush holder 66) which is electrically connected to the other conductor 70 of the output cable 17, thus defining a series connection of the motor.

An electrical signal generating assembly comprising a dynamic and relatively static portions are disposed at a location between the rotor and the middle bearing holder 41.

The dynamic portion 72 comprises a non-ferrous ring 73 secured to the rotor shaft 56 and constrained to rotate therewith in a balanced symmetrical relation thereto. Four, essentially identical, permanent magnets 74 are imbedded and secured in the ring at 90° angular displacements thereabout each at positions substantially equidistant from the rotor shaft 56.

The static portion 76 of the signal generating assembly comprises an annular structure 77 of non-ferrous material press fitted into the inner end of the cylindrical housing 23. The annular structure 77 has a central hole 78 through which the rotor shaft 56 can freely pass. Imbedded in the annular structures are two sensing coils 78' disposed at 180° angular displacements about the structure with each of the principal axis of the coils disposed parallel to end, and outward from the rotor shaft at distances such that they are substantially aligned with the central portions of the permanent magnets 74 imbedded in the ring 73. The coils may be secured in place by encapsulating them in epoxy resin material. Each sensing coil comprising windings 80 wound about a soft iron core 81 in the form of a rod disposed coaxial of the principal axis of the coil and having one end thereof disposed in close proximity to the permanent magnets. It has been found that this clearance distance should be in the range of 1/32 of an inch. The soft iron core 81 provides a minimal magnetic retentivity and low reluctance path for the magnetic field of the permanent magnets thereby assuring the sensitivity of the sensing coils at low angular velocities of the rotor shaft 56 but yet does not significantly saturate at high rotor speeds.

It has been found that for the electronic control circuit 15 having the components with values hereinafter described that satisfactory speed control results were achieved when each sensing coil 78' was made up of approximately 400 turns of 32 gauge magnet wire wound about the iron core 81.

The cylindrical housing has a hole 83 therethrough communicating with the space 84 between the annular structure 76 and the middle bearing. A grommet 85 is secured in the hole and receives the signal cable 18. The signal cable comprises two conductors 87 and 88 connected to the windings 80 of the sensing coils 78'. It should be noted that the coils 78' are connected in series additive. Since the sensing coils are diametrically spaced on the annular structure 77, the magnets 74 passing by the coil 78' will generate a voltage therein having a value proportional to the angular velocity at which the magnet passes the coil. It is obvious that the angular velocity of the magnets 74 is also the angular velocity of the rotor shaft 56 and the tool bit 35 in the machine tool illustrated. Because of the series connection of the sensing coils, the voltage generated in each coil will add together and because of the 90° magnet spacing the coils will combine to produce two electrical voltage pulses for every revolution of the rotor. These pulses are conducted to the electronic control circuit via the conductors 87 and 88 of the signal cable 18.

Turning attention to FIG. 4, the electronic control circuit 15 comprises a phase-control circuit, designated 90 and a triggering network designated 90 operative to select and substantially maintain a selected speed relationship between the motor 45 and the phase-control circuit's output.

The control circuit has a common conductor 93 connected to one conductor of the line cord 19 and connects to one side of a primary winding 94 of an isolating and step-down transformer 95 and to the field winding 47 of the motor 45 through conductor 71 of the output cable 17. The other conductor from the line cord is connected to the switch 21 which is serially coupled to a circuit protecting device such as a fuse 96. The other side of the primary winding 97 of transformer 95 is connected to the fuse 96 along with another conductor 98 which feeds into the phase-control circuit 90 and connects thereat to capacitors 100, 101 and 102 and a main terminal 103 of a bidirectional triode thyristor 104 commonly referred to as a triac. The capacitors 101 and 102 are connected to a resistor 105 which has one terminal thereof connected to a three-layer bidirectional avalanche diode 106 usually referred to as a diac. The other terminal of the diac 106 is connected to a gate terminal 107 of the triac 104. The other terminal of the resistor 105 is coupled to the triggering circuit 91 via a conductor 108. The capacitor 100 is serially connected with a resistor 109 which in turn connects to the conductor 70 of output cable 17, the other main terminal 110 of the triac 104 and a conductor 111 which couples to the triggering circuit 91. The resistor 109 and capacitor 100 serve to shunt the triac 104 of the inductive effect of the motor.

The triggering circuit of the control circuit comprises the transformer 95 having its secondary winding 97 appropriately connected to the A.C. terminals 117 and 117' of a full wave rectifier 112 made up of rectifying elements 113, 114, 115 and 116 interconnected in the usual full wave rectifying configuration. The positive D.C. output of the rectifier 112 is connected to a surge limiting resistor 118 which connects to a filtering arrangement comprising capacitor 119 and resistor 120 as shown. The negative D.C. output of the rectifier 112 connects to a common conductor 121 to which the capacitor 119 is connected. Connected across the circuit at points "A" and "B," i.e. from the resistor 120 to the common conductor 121 is a zener diode 122 which is used to provide a constant voltage reference across these points ("A," "B"). The entire common conductor 121 defines the point "B".

A high speed calibrating variable resistor 125 is connected in series with a speed control potentiometer 126 across the zener diode 122. From the point "A" is connected a low speed calibrating variable resistor 127 which in turn connects to the conductor 88 of the signal cable 18. A biasing resistor 129 connected in series at point "C" with a capacitor 130 are coupled between the points "A" and "B". A pair of serially arranged diodes 131 and 132 having a common connection at point "D" are connected at one end to point "C" and at their other end to the wiper arm 133 of the potentiometer 126. The diodes 131 and 132 are arranged to allow unidirectional current flow from point "C" to the potentiometer 126.

A direct current blocking capacitor 134 is connected from the conductor 87 of the signal cable 18 to the point "D" between the diodes 131 and 132. This capacitor 134 prevents the sensing coils 78' from carrying a current which would otherwise be produced by the reference voltage between points "A" and "B".

A bipolar power transistor 140 of the NPN type is arranged in common-emitter configuration with the emitter terminal 141 thereof connected to emitter resistor 142 which is connected to the common conductor 121. The collector terminal 143 of the transistor 140 connects to the positive output terminal 144 of a full wave rectifier 146 comprising rectifying elements 147, 148, 149 and 150 connected in the normal manner. The negative output terminal of the rectifier 151 is connected to the common conductor 121 thereby providing that point "B" be the reference for the collector-emitter circuit of the transistor 140. The base terminal 139 is connected to the terminal "C" as shown.

The A.C. input terminals 152 and 153 of the rectifier 146 are connected to the conductors 111 and 108 respectively with a shunting resistor 155 connected thereacross as shown.

The operation of the phase-control circuit can be best explained by considering that the switch 21 has just been turned on and the motor 45 has not yet begun to turn. At this time the transformer 95 presents an A.C. voltage to the rectifier 112 which is rectified to a D.C. voltage. This voltage is regulated at a reference voltage by the zener diode 122 across the points "A" and "B." It is assumed that the variable resistors 125, 127 and potentiometer 126 have been set to provide for some predetermined motor speed and therefore the point "C" will be biased to produce a biasing transistor current at the base terminal 139 which causes the transistor 140 to conduct heavily initially thereby having the effect of presenting a low charging resistance to the capacitor 101 which then charges quickly to the breakover voltage of the diac 106 which then fires and conducts through the gate terminal 107 of the triac 104 to turn it on. The rate at which the capacitor 101 charges determines the conduction angle of the triac 104 thereby determining the average voltage across the motor. Since the transistor 140 will provide an impedance level to control the charging rate of the capacitor 101 it therefore will control the average output voltage of the phase-control circuit 90 across the motor. As the motor speed increases the sensing coils 78' will begin to generate an increasing voltage which is rectified by the diodes 131 and 132. The capacitor 130 has a smoothing effect at point "C" from the pulsating effect of the rectified generated voltage applied at point "D." Since the voltage generated by the sensing coils is proportional to the speed of the motor the potential at point "D" will increase until it exceeds the difference in potential between the wiper arm 133 and the point "C." This effect causes a change in the value of biasing current to cause the conductance of the transistor 140 to decrease and thus decreasing the charging rate of the capacitor 101 until equilibrium is reached. If the motor should speed up or slow down because of a change in load, the sensing coil voltage will increase or decrease respectively to effect a respective decrease or increase in the charging rate of the capacitor 101 by correspondingly changing the conductance of the transistor 140. It can be appreciated by the foregoing that once a speed has been selected by the positioning of knob 22 which is connected to the wiper legs 133 of the speed control potentiometer 126 it will be maintained by the action of the sensing coils on the transistor 140 modulating the impedance between the collector-emitter terminals 143, 141 having the effect of regulating the firing angle at which the triac conducts. Because the speed characteristic of the universal motor 45 is a function of the average voltage impressed across the motor it can be appreciated the phase-control circuit will provide a novel selection of speed control having means to automatically maintain a speed which has been elected.

The entire system is calibrated by selecting a speed of about 5,000 R.P.M. with the control knob 22 and varying the speed of the motor 45 by adjusting the low speed calibrating variable resistor 127 until the selected low speed is attained. The speed of the chuck 34 may be measured by an instrument such as a tachometer (not shown) to determine when the selected speed is attained.

Then the speed control knob 22 is set at about 22,000 R.P.M. (revolutions per minuts) and the high speed calibrating variable resistor 125 is adjusted until the selected high speed is attained. The motor and speed-control circuit are now calibrated.

It is contemplated from the foregoing that a hydraulic or air driven motor could be used in place of the universal motor 45 by providing a signal voltage generating system similar to that described hereinbefore and where the output voltage of the phase-control circuit would be coupled to an electrically operated hydraulic or air valve having fluid flow characteristics being a function of the average voltage impressed across the electrical operator of the valve.

For the purpose of disclosure only, it being understood that the present invention is not limited to values hereinafter described, the components may be of the type or have a particular value as follows:

Transformer 95, 120v Pri. 30v Sec, A6208 Geo. Space P2736
Rectifier 112, 146 RCA 1N3756
Resistor 118, 27 ohm ½ watt
Resistor 120, 680 ohm 1 watt
Resistor 129, 27K ohm ½ watt
Resistor 142, 100 ohm ½ watt
Resistor 155, 68K ohm 1 watt
Resistor 109, 100 ohm ½ watt
Resistor 105, 15K ohm 1 watt
Resistor (variable) 127, 1K ohm 2 watt
Resistor (variable) 125, 5K ohm 2 watt
Potentiometer 126, 3K ohm 2 watt
Zener Diode 122, Motorola 1N4751
Transistor 140, RCA 40327
Triac 104 RCA 40575
Diac 106 RCA 1N5411
Capacitor 100, 0.05 MFD 200v
Capacitor 101, 102, 0.1 MFD 200v
Capacitor 119, 1100 MFD 50v
Capacitor 134, 2 MFD 50v
Capacitor 130, 1.0 MFD 200v It will be appreciated that the embodiment of the invention has been chosen for the purposes of illustration and description herein is that preferred based upon requirements for achieving the objects of the invention and developing the utility thereof in the most desirable manner. It will be understood, that the particular structure and functional aspect emphasized herein are not intended to exclude but rather to suggest such other modifications and adaptations as fall within the spirit and scope of the invention as hereinbefore described.

What is claimed is:

1. A phase-control circuit adapted to be serially coupled between an alternating current source and a load comprising: a bidirectional thyristor having a pair of main terminals connectable between the source and load and including a control gate terminal; an avalanche diode coupled to said gate terminal; a charging circuit coupled to said avalanche diode and one of said main terminals and operative to fire the thyristor at a plurality of conduction angles being a function of the charging rate of said circuit; impedance means serially coupled to said charging circuit effective to determine the charging rate thereof; said means including a fixed conductance element and a variable conductance element; a rectifying network serially coupling said charging circuit and said variable impedance element and said rectifying network and said fixed conductance connected in parallel relationship; said rectifying network operative to couple said variable conductance element in series relation to said charging circuit to effect control of the charging rate of said charging circuit in response to variations in conductance levels of said impedance means; and control means coupled to said impedance means and operative to selectively vary and modulate an elected conductance level thereof to maintain a selected load characteristic.

2. The invention as recited in claim 1 wherein said charging circuit comprises a capacitor coupled to said avalanche diode and referenced to said thyristor for firing the same, and said control means comprises first and second impedance elements operative for respectively calibrating high and low operating characteristics of said circuit.

3. The invention as recited in claim 2 wherein said variable impedance element comprises a transistor coupled between said rectifying network and said control means, and said fixed impedance element comprises a resistor coupled in parallel relation to said rectifying network, wherein the conductance level of said transistor and said resistor regulate the charging rate of said capacitor.

4. The invention as recited in claim 3 wherein said transistor is of the bipolar type coupled in common emitter configuration to said rectifying network coupled in biasing relation to the base terminal of said transistor and effective to select conductance levels thereof, and said control means comprising voltage generating means producing a voltage value having a magnitude corresponding to changes in load characteristics, and means operatively coupling said voltage generating means to said base terminal and being effective to bias the transistor to modulate the conductance level thereof in response to load changes to regulate the conductance angle at which the thyristor fires and thereby maintain the selected load characteristic.

5. The invention as recited in claim 4 wherein said avalanche diode is a bidirectional avalanche diode coupled between said capacitor and said gate terminal of said thyristor to provide close control of the firing voltage to said thyristor.

6. An electronic control circuit adapted for coupling between a voltage source and a receptive load and being operative to selectively control and modulate an average load voltage to maintain an elected value of load output, comprising: a controlled thyristor having a pair of main terminals coupled between said source and load and having a control gate terminal; an avalanche diode coupled to said gate terminal; a capacitor coupled to said gate terminal bidirectional avalanche diode and that main terminal coupled to said source, and being chargeable to a voltage to fire the thyristor at a plurality of conduction angles each corresponding to a charging rate of the capacitor; a variable impedance level circuit coupled to said capacitor being operative to vary the charging rate thereof in relation to impedance level variations, said circuit comprising, variable impedance means operative to effect a variable impedance level; a full wave rectifier bridge serially coupling said capacitor and said variable impedance means, and a fixed impedance element coupled in parallel relation to said bridge, wherein said impedance level thereof is operatively effective to control the charging rate of said capacitor, first means coupled to said variable impedance means and operative thereon to selectively establish an impedance level thereof, and second means coupled to said variable impedance means and operative thereon to modulate the impedance level thereof in response to deviations from the elected value of load output to thereby maintain the elected value.

7. The invention as recited in claim 4 wherein said variable impedance means comprises: a bipolar transistor coupled to said rectifier bridge to operatively couple a variable impedance level thereof to said capacitor.

8. The invention as recited in claim 6 wherein said transistor has a control terminal operative to regulate the impedance level of said transistor in relation to a biasing transistor current flowing thereat, said first means comprising a variable voltage network including a first variable impedance element, said network coupled to said control terminal operative to selectively produce a biasing transistor current, said second means including second variable impedance element and operative to produce a voltage having a magnitude being a function of the value of load output and coupling that voltage to said control terminal to modulate the biasing transistor current to thereby provide a varying average load voltage effective to maintain said elected value of load output, said first and second variable impedance elements operative to respectively calibrate the high and low operating characteristics of said control circuit.

9. In a machine tool having a rotatable portion for driving a tool bit; electrically actuated means operative to drive said portion; a phase-control circuit operatively coupled to said means for selecting and maintaining an elected speed of said portion, comprising: a controlled bidirectional thyristor having a control gate terminal and first and second main terminals connected between an alternating current source and said drive means; a firing circuit comprising a bidirectional avalanche diode coupled to said gate terminal and a capacitor coupled to said diode and one of said main terminals; variable impedance level means effective to provide impedance levels to control the charging rate of said capacitor for firing said thyristor; a full wave rectifying bridge serially coupling said firing circuit to said variable impedance level means; fixed impedance level means coupled in parallel relation to said rectifying bridge; first means coupled to said variable impedance means and operative thereon to selectively effect impedance levels thereof; and second means coupled to said variable means and operative thereon to modulate the impedance level thereof to maintain the elected speed of said portion.

10. The invention as recited in claim 9 and said variable impedance level means comprises a transistor providing variable impedance levels and having a control terminal coupled to said first and second means, said rectifying bridge coupled between said transistor and said firing circuit.

11. The invention as recited in claim 10 wherein said transistor is of the bipolar type coupled in an output common-emitter configuration to said rectifying bridge, said first means comprising a variable voltage network coupled to the base terminal of said transistor and including a first variable impedance element, said network operative to provide a transistor biasing current thereat effective to produce selected output impedance levels at the rectifier, and said second means comprising: voltage generating means connected to said rotatable portion and operative to generate a voltage having a magnitude proportional to the speed of said portion, means coupling said generated voltage to said base terminal to modulate the transistor biasing current to vary the impedance level of said transistor thereby to maintain said elected speed, said means including a second variable impedance element, said first and second variable impedance elements operative to respectively calibrate the high and low operating characteristics of said control circuit.

12. The invention as recited in claim 10 wherein said first means comprises a voltage network having variable resistor coupled to said control terminal and operative to selectively provide biasing current values thereat.

13. The invention as recited in claim 12 wherein said second means comprises a voltage generating means connected to a rotary portion of said motor and operative to provide a voltage having a magnitude proportional to the speed of said rotary portion said coupling, means coupling said generated voltage to said input control terminal of said transistor in such a manner that the biasing current thereat is modulated to vary the impedance level of the transistor to maintain the elected motor speed by correspondingly varying the average voltage to the motor.

* * * * *